United States Patent [19]

Russell

[11] 4,178,406
[45] Dec. 11, 1979

[54] THREE-LAYERED FIBERGLASS CONSTRUCTION

[75] Inventor: Larry M. Russell, Doylestown, Pa.

[73] Assignee: Rohm and Haas Company, Philadelphia, Pa.

[21] Appl. No.: 865,567

[22] Filed: Dec. 29, 1977

[51] Int. Cl.$^2$ ............................................. B32B 5/16
[52] U.S. Cl. .................................. 428/283; 156/245; 264/101; 428/284; 428/285; 428/286; 428/297; 428/298; 428/302; 428/406
[58] Field of Search ............... 428/283, 284, 285, 286, 428/287, 298, 300, 301, 302, 426, 311, 317, 406

[56] References Cited

U.S. PATENT DOCUMENTS

| | | | |
|---|---|---|---|
| 2,794,759 | 6/1957 | Dildilian | 428/300 |
| 3,272,645 | 9/1966 | Duhoo et al. | 428/283 |
| 3,316,139 | 4/1967 | Alford et al. | 428/227 |
| 3,382,302 | 5/1918 | Marzocchi | 428/402 |
| 3,554,851 | 1/1971 | Modigliani | 428/317 |
| 3,567,568 | 3/1971 | Windecker | 428/311 |
| 3,867,221 | 2/1975 | Chant | 428/420 |
| 3,915,783 | 10/1975 | Goppel et al. | 428/298 |
| 4,013,810 | 3/1977 | Long | 428/317 |
| 4,028,477 | 6/1977 | Goppel et al. | 428/285 |
| 4,044,188 | 8/1977 | Segal | 428/298 |
| 4,098,943 | 7/1978 | Degginger et al. | 428/285 |
| 4,121,008 | 10/1978 | Seddon | 428/285 |

Primary Examiner—James J. Bell
Attorney, Agent, or Firm—Michael B. Fein; Lester E. Johnson

[57] ABSTRACT

This invention is directed to an improved process for making fiber reinforced articles comprising the steps of (a) applying a preformed plastic shell having the configuration of the desired article to a holding fixture therefore having sealing means at the peripheral edges thereof; (b) applying to the surface of the shell fibrous reinforcement material; (c) introducing to the reinforcement material a liquid plastic resin mixture; (d) applying to the surface of the resin mixture-containing reinforcement material a preformed plastic membrane having the configuration of the desired article; (e) sealing the peripheral edges of the membrane to the peripheral edges of the holding fixture to provide a molding system; (f) applying a vacuum to the molding system to compact the molding system and to draw said resin mixture throughout the reinforcement material; (g) hardening the resin mixture; and (h) separating the resulting article from said plastic membrane and said holding fixture. The invention is also directed to fiber reinforced articles made by the method of the invention.

2 Claims, 5 Drawing Figures

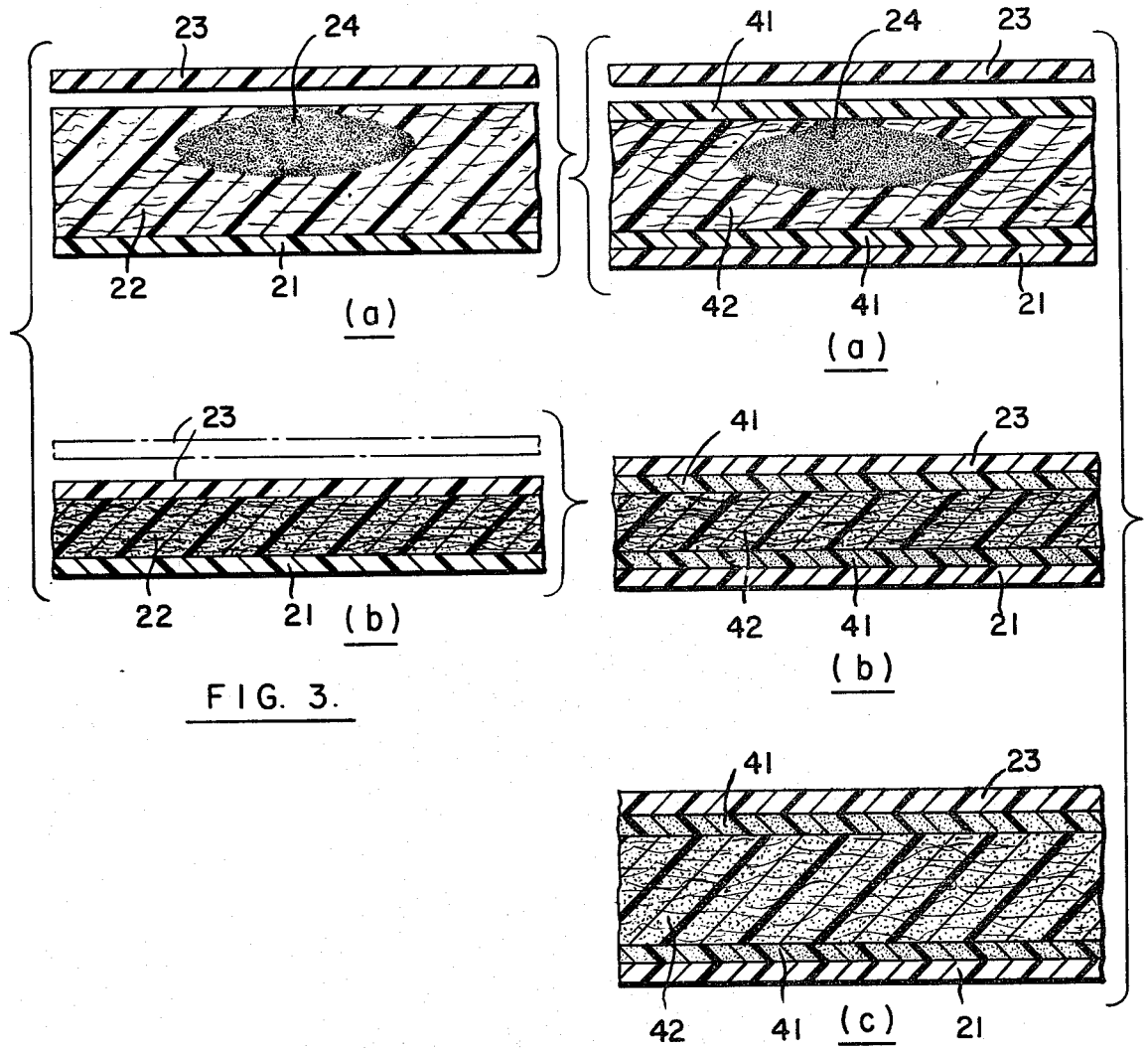
FIG. 3.
FIG. 4.
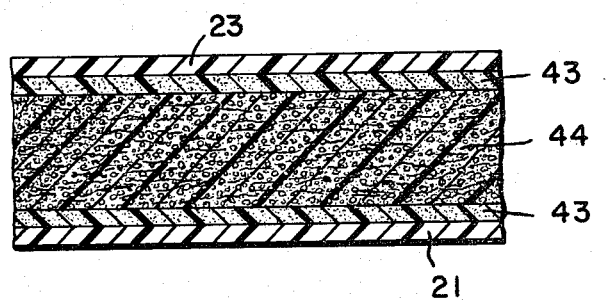
FIG. 5.

ND CONSTRUCTION

BACKGROUND OF THE INVENTION

1. Field of the Invention

This invention relates to an improved method for making fiber-reinforced articles and to improved articles made thereby. More particularly, the invention relates to an improved method for making a thermoplastic article having a fiber-reinforced structure.

2. Description of the Prior Art

Reinforced thermoset plastics and composite materials such as, for example, fiberglass reinforced polyesters, and a variety of methods for making the same are known in the art. Many of these known articles and methods are described in the "SPI HANDBOOK OF TECHNOLOGY AND ENGINEERING OF REINFORCED PLASTICS/COMPOSITES," 2d ed., J. Gilbert Mohr, Senior Author, Van Nostrand Rheinold Company, New York, 1973, including hand lay-up methods, pp. 15–54; spray-up methods, pp. 77–94; cold press (or cold-forming) molding, pp. 352–358; the Marco method, pp. 103 et seq.; preform and SMC molding, pp. 86–87, 109–111, 127–143, and 175–239; and vacuum bag molding, including pressure bag molding and rubber plunger molding modifications thereof, pp. 77–94. Articles prepared by these methods include laminates or composites. As used throughout the specification, the term "laminate" means an article containing one or more of a single type of reinforcement material and a surface of a cured resin mixture; the term "composite" means an article containing a mixture of layers of different types of reinforcement material and a surface of cured resin mixture. U.S. Pat. Nos. 3,915,783 and 3,567,568 and 3,867,221 and British Pat. Nos. 1,432,333 and 1,068,503 disclose laminates and composites and methods for preparing the same. These known methods suffer one or more of the disadvantages including poor control of resin application and distribution, poor control of compaction; poor control of fumes from the resin; relatively high labor costs, relatively slow production cycle; relatively expensive tooling and equipment; high maintenance costs; and difficulty in obtaining an optional combination of physical properties, cosmetic surface appearance, and design characteristics. There yet exists a need in the art for articles, and methods for preparing the same, possessing an optimal combination of two opposing physical properties—high strength of the reinforcing material and low stiffness modulus of the plastic phase.

SUMMARY OF THE INVENTION

It is an object of this invention to provide an improved method for making a fiber reinforced plastic article.

Another object is to provide an improved fiber reinforced article, produced by the method of the invention, characterized by an outstanding combination of desirable properties including high impact strength to weight ratio, high stiffness to weight ratio, cosmetic surface appearance, weatherability, design characteristics, and resistance to delamination.

These and other objects as will become apparent are achieved by this invention which comprises an improved method for making a fiber reinforced article comprising the steps of:

(a) applying a preformed plastic shell having the configuration of the desired article to a holding fixture therefore having sealing means at the peripheral edges thereof;
(b) applying to the surface of said shell fibrous reinforcement material;
(c) introducing to said reinforcement material a liquid plastic resin mixture;
(d) applying to the surface of said resin mixture—containing reinforcement material a preformed plastic membrane having the configuration of the desired article;
(e) sealing the peripheral edges of said membrane to the peripheral edges of said holding fixture to provide a molding system;
(f) applying a vacuum to said molding system to compact said molding system and to draw said resin mixture throughout said reinforcement material;
(g) hardening said resin mixture; and
(h) separating the resulting article from said plastic membrane and said holding fixture.

BRIEF DESCRIPTION OF THE DRAWINGS

For a fuller understanding of the nature and objects of the invention, reference should be had to the following detailed description of the invention taken in connection with the accompanying drawings in which:

FIG. 3 is a partial cross-sectional view, in greater detail, taken on line 2—2 of FIG. 1, of certain parts of the assembly showing the condition of the parts (a) before vacuum is applied and (b) after vacuum is applied.

FIG. 4 is a partial cross-sectional view of a different embodiment employing an expandable fiberglass construction described in greater detail hereinbelow, taken on line 2—2 of FIG. 1, of certain parts of the assembly showing the condition of the parts (a) before vacuum is applied, (b) after vacuum is applied, and (c) after vacuum is reduced.

FIG. 5 is a partial cross-sectional view of another different embodiment employing a microsphere-filled fiberglass construction described in greater detail hereinbelow, taken on line 2—2 of FIG. 1, of certain parts of the assembly showing the condition of the parts after vacuum is applied.

DETAILED DESCRIPTION OF THE DRAWING AND OF THE PREFERRED EMBODIMENT

Figure 1:
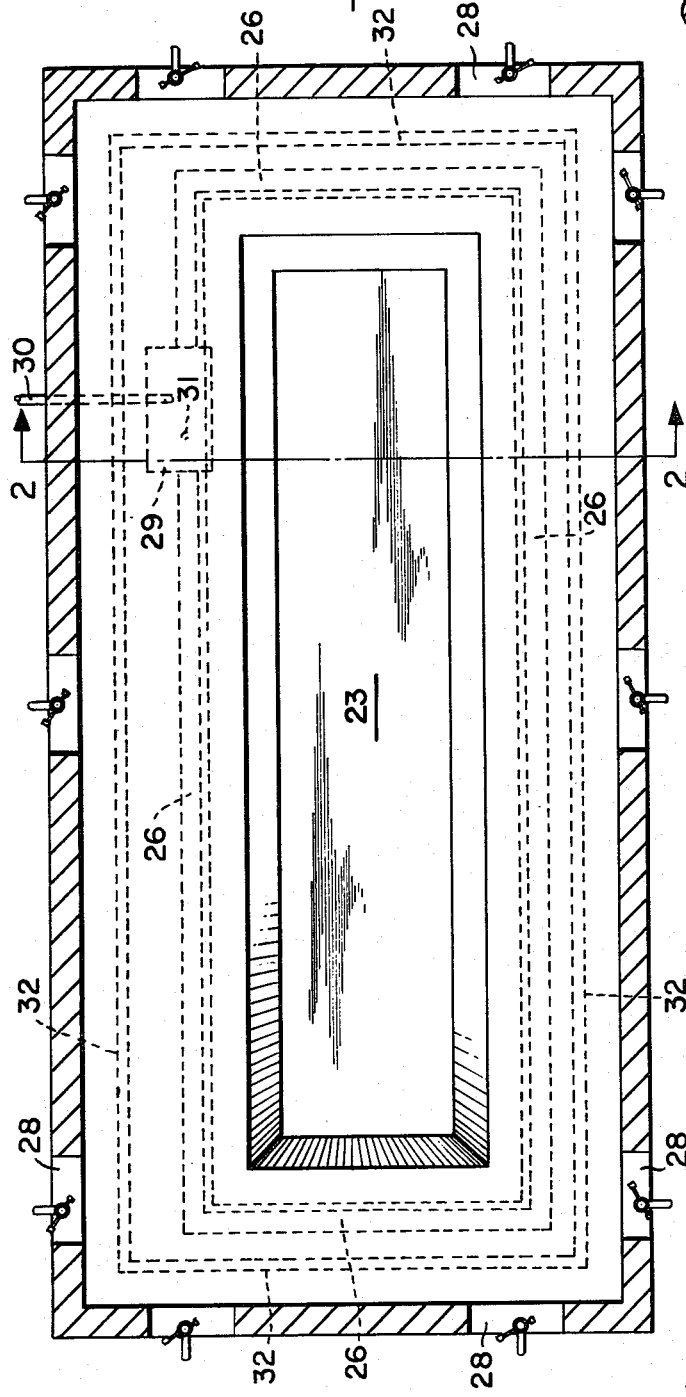
FIG. 1 is a top view of the assembly used in the method of the invention.

In FIG. 1, a preformed plastic membrane 23 clamped in a frame 28 is shown mounted above a box support 32 fitted with a resin trap system 29 and a connection 30 to a vacuum pump associated with a vacuum port or outlet and a strip of bleeder material.

Figure 2:
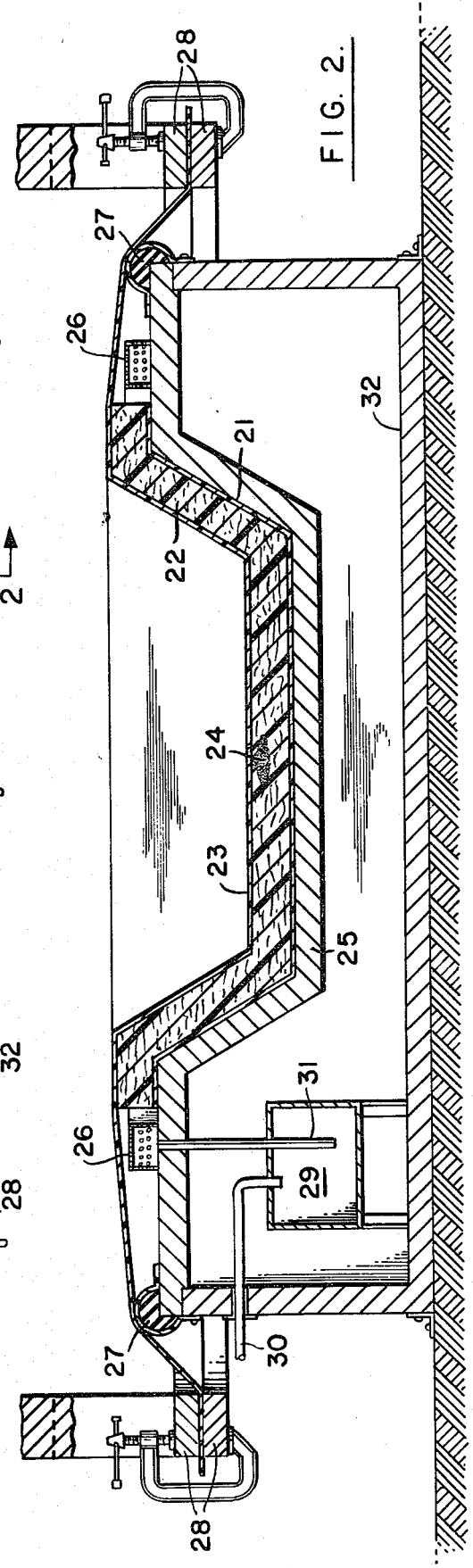
FIG. 2 is a cross-sectional view, in greater detail, of the assembly taken on line 2—2 of FIG. 1, this view showing the parts in their condition before vacuum is applied.

By referring to FIG. 2, the method of this invention can best be understood. A holding fixture 25, made as described hereinbelow, is provided on a box support 32 and, further, is equipped with a rubber fitting 27 about the peripheral edge of the fixture, a strip of bleeder material 26 within the circumference of the rubber fitting, and a vacuum port or outlet 31 which is further associated with a resin trap system 29 and a connection 30 to a vacuum pump.

Next, after removing any loose particles from the holding fixture and the surface of the plastic shell, the preformed plastic shell 21 is applied to the holding fixture 25.

Then, fibrous reinforcement material 22 is applied to the surface of the plastic shell 21. As is set forth hereinbelow, the fibrous reinforcement material 22 is most preferably a preformed mat of chopped strand, or continuous strand, fiberglass held together by thermoplastic binder resin; or a preformed expandable fiberglass construction of a center layer of continuous strand fiberglass mat containing cured thermosettable binder resin between outer layers of chopped strand fiberglass mat containing thermoplastic binder resin; or a preformed fiberglass construction of a center layer of continuous strand fiberglass mat containing lightweight microspheres in the voids thereof and thermoplastic binder resin between outer layers of chopped strand fiberglass mat containing thermoplastic binder resin.

Next, liquid plastic resin mixture 24 is introduced to the fibrous reinforcement material 22 in sufficient quantity to saturate the reinforcement material throughout.

Then, the preformed membrane 23, clamped in a frame 28, is lowered over the assembly and applied to the surface of the resin mixture-containing reinforcement material. The plastic membrane 23 is sealed at the peripheral edge 27 of the holding fixture by means of applying moderate pressure or by using any known sealing agent applied to the rubber fitting 27, thereby providing a molding system.

Next, vacuum is applied through the vacuum connection 30, the resin trap 29, the vacuum port or outlet 31, and the bleeder 26, whereby air is withdrawn from the molding system ahead of the resin mixture which is drawn throughout the reinforcement material, and atmospheric pressure—approximately 27 inches of mercury—is brought to bear on the preformed plastic membrane thereby compacting the reinforcement material and aiding the saturation thereof with resin mixture.

Finally, when the reinforcement material is saturated throughout with resin mixture and while maintaining the molding system under vacuum, the resin mixture is hardened. If desired, moderate heat, that is, heat which is sufficiently low to prevent an exotherm exceeding the heat distortion temperature of the plastic shell, may be applied to accelerate the cure of the resin mixture.

Alternatively, when the expandable fiberglass construction of the invention is employed as the fibrous reinforcement material, the vacuum may be reduced to about 4 inches of mercury when the fiberglass construction is saturated throughout with resin mixture, thereby allowing the center layer or core of the fiberglass laminate to expand from a compacted state, effected by the initial reduced pressure on the molding system, to its original expanded open network state.

In FIG. 3a, the condition of a preformed plastic membrane 23 mounted above a layer of a single kind of fibrous reinforcement material 22 to which plastic resin mixture 24 has been introduced, the reinforcement material being applied to a preformed thermoplastic shell 21, is shown before vacuum is applied. In FIG. 3b, the compacted condition of these same parts is shown after vacuum is applied and the resin mixture is distributed throughout the reinforcement material.

In FIG. 4(a), the condition of a preformed plastic membrane 23 mounted above a layer of an expandable fiberglass construction of a center layer 42 of continuous strand fiberglass mat containing resin mixture 24 between two outer layers 41 of chopped strand fiberglass mat, the reinforcement material being applied to a preformed plastic shell 21, is shown before vacuum is applied. In FIG. 4(b), the compacted condition of these same parts is shown after vacuum is applied and the resin mixture is distributed throughout the reinforcement material. In FIG. 4(c), the condition of these same parts is shown after the vacuum is reduced wherein the resin mixture-saturated center layer 42 of continuous strand fiberglass mat is expanded from a compacted state to its original open network state.

In FIG. 5, the compacted condition of a preformed plastic membrane 23 mounted above a layer of a microsphere-filled reinforcement material of a center layer 44 continuous strand fiberglass mat containing microspheres between two outer layers 43 of chopped strand fiberglass mat, the reinforcement material containing resin mixture distributed throughout and being applied to a preformed plastic shell 21, is shown after vacuum is applied.

The material to be selected for use as the preformed plastic surface of the article made in the process of this invention requires a combination of desirable properties. Among these properties are the following: (1) outdoor weatherability; (2) impact resistance; (3) capability to form a chemical bond with the polymerizable, liquid thermosettable resin to be used in forming the laminate; (4) availability of the material in thin sheet form suitable for use in the process; (5) attractive cosmetic qualities such as color and texture variation; and (6) ease of handling during processing.

Preferably, the preformed plastic shell used in this invention comprises a plastic composition selected from the group consisting of: (a) a cured thermoplastic composition prepared from a monomer mixture comprising at least one monomer selected from the group consisting of alkyl and aralkyl acrylate, alkyl and aralkyl methacrylates, vinyl chloride, acrylonitrile, methacrylonitrile, butadiene, styrene, substituted styrenes, and mixtures thereof; and (b) a gel coat. The cured thermoplastic composition includes impact-modified materials.

More preferably, the plastic shell comprises a cured thermoplastic composition prepared from a monomer mixture comprising at least 50% by weight of at least one monomer selected from the group consisting of alkyl acrylates, aralkyl acrylates, alkyl methacrylates, and aralkyl methacrylates. A shell having this composition is also referred to as an acrylic shell.

Most preferably, the plastic shell comprises a cured thermoplastic composition prepared from a blend of (1) from about 10% to 96% by weight of a rigid thermoplastic polymer comprising a homopolymer of a ($C_1$–$C_4$) alkyl methacrylate or a copolymer of at least 50% by weight of a ($C_1$–$C_4$) alkyl methacrylate and the balance, to total 100%, of at least one other copolymerizable monoethylenically unsaturated monomer; and (2) from about 90% to 4% by weight of a multi-stage, sequentially-produced polymer characterized by:

(a) a non-elastomeric, relatively hard first stage having a Tg greater than 25° C., polymerized from a monomer mixture comprising 70% to 100% by weight of at least one of the monomers specifically mentioned above for the rigid thermoplastic polymer, 0% to 10% by weight of a copolymerizable polyfunctional crosslinking monomer, and 0.05 to 5.0% by weight of a copolymerizable graftlinking monomer;

(b) an intermediate elastomeric stage, polymerized in the presence of a product containing the first stage, from a monomer mixture comprising 50% to 99.9% by weight of a ($C_1$-$C_8$) alkyl acrylate or mixtures thereof, 0 to 49.9% by weight of a copolymerizable monoethylenically unsaturated monomer 0 to 5.0% by weight of a copolymerizable polyfunctional crosslinking monomer, and 0.05 to 5.0% by weight of a copolymerizable graftlinking monomer, the latter stage further characterized in that it would exhibit a Tg of 25° C. or less if the monomers were polymerized in the absence of the product containing the first stage; and (c) a final stage polymerized in the presence of a product containing said first and said intermediate stages from a monomer mixture comprising 70% to 100% by weight of at least one of the monomers specifically mentioned above for the rigid thermoplastic polymer, the final stage further characterized in that it would exhibit a Tg greater than 25° C. if the monomers were polymerized in the absence of the product containing the first and intermediate stages, said graftlinking monomer having two or more addition polymerizable unsaturated reactive groups which participate in the polymerization reaction at substantially different rates and said crosslinking monomer having a plurality of addition polymerizable unsaturated groups all of which participate in the polymerization reaction at about the same rate as one another.

When the plastic shell comprises a cured thermoplastic composition, it is obtained in sheet form and may be used in flat sheet form to make flat articles or, especially advantageously, the sheet may be thermoformed into any desired configuration for use in making articles having a particular configuration by the method of the invention. When the plastic shell comprises a gel coat, it is obtained and applied to a release agent-treated holding fixture by known methods.

Although the plastic surface of the product article may be of any desired thickness, it is preferred that the article have a minimal plastic surface thickness of 0.030 inches. Generally, it is desirable to obtain an article having an average plastic surface thickness of about 0.040 inches. The thickness required in the blank sheet may be estimated by obtaining the product of the equation, part sq. ft./blank sheet sq. ft. times the average part thickness.

When a thermoplastic sheet is used, it may be thermoformed to any desired configuration by known thermoforming techniques. Automatic or semi-automatic thermoforming equipment may advantageously be used so as to provide a thermoforming sequence which is fast enough to prevent premature cooling during the forming step and defects resulting therefrom, to provide greater consistency in the formed shells thereby obtained, to reduce labor costs, and to allow for larger-scale production. The heating source used may be, for example, any suitable heating oven or infrared heating device. The molds used in thermoforming the thermoplastic sheet may be of, for example, cast aluminum or fiberglass/plastic composition. By using collapsible molding devices, thermoplastic shells having undercut designs can be formed.

The preformed plastic membrane should be (1) transparent to allow for visual monitoring of the progress of the method of the invention and to allow penetration of radiant energy, if used, to promote cure of the polymerizable, liquid thermosettable resin, (2) tough so that it will not tear or puncture during handling, and (3) thermoformable. Preferably, the preformed plastic membrane may be made from a member selected from the group consisting of polyvinyl alcohol (PVA), nylon, polyolefin, polyolefin/polyester, polyvinyl-chloride, and fiberglass reinforced silicone rubber films. Most preferably, the plastic membrane is made from a plasticized polyvinyl alcohol film.

The plastic membrane may be flat for use in making flat articles or, alternatively, it may be preformed into any desired configuration by thermoforming or vacuum forming techniques. The method of this invention is especially advantageous in making articles having variable configuration characteristics wherein the plastic membrane possesses the particular configuration characteristics of the desired article. When it is desired to use thermoforming techniques, the same molding equipment that is used to preform the thermoplastic shell may be used. On the other hand, when vacuum forming techniques are used to make the preformed plastic membrane, the holding fixture which is subsequently used in the method of the invention may be used. The plastic film is exposed to heat, for example, infrared heat, and the heated film is quickly lowered over the mold or holding fixture so that it seals itself to the peripheral edges thereof and vacuum is applied to remove air from the enclosed system so that the action of atmospheric pressure then conforms the film to the contours of the mold or holding fixture.

The fibrous reinforcement material which is used in this invention comprises at least one material selected from the group consisting of continuous strand fiberglass, chopped strand fiberglass, nylons, carbon, boron, aramids, woven fabrics and mixtures thereof. More preferably, the fibrous reinforcement material comprises material selected from the group consisting of continuous strand fiberglass, chopped strand fiberglass, and mixtures thereof, obtained in mat form. Most preferably, the fibrous reinforcement material comprises a performed fiberglass construction having the configuration of the desired article wherein the fiberglass construction comprises one or more layers of fiberglass mat having a glass content of from about 90% to about 99.9% by weight, the balance to total 100% by weight comprising binder resin which holds together the glass fibers in the mat and which confers upon the preformed mat the desired shape.

In one most preferred embodiment, at least one layer of fiberglass mat, for example, a chopped strand fiberglass mat containing a sufficient amount of thermoplastic binder resin to hold together the glass fibers in the form of a mat and to impart to the mat the configuration of the desired article, is heated in an oven which is set at a temperature sufficiently high to soften the binder. When the binder becomes soft, the mat is positioned over a mold or holding fixture so that a pressure ring can be lowered onto, and restrict the motion of, the mat as it is forced into the cavity of the mold or holding fixture.

The heated mat and pressure ring are then lowered into the cavity of the mold or holding fixture using minimum pressure so as to prevent stretching of the mat and bunching of the edges of the mat but, at the same time, using sufficient pressure to confer upon the mat the shape of the cavity. The resulting preformed fiberglass construction may then be used in the method of the invention.

In another most preferred embodiment, a preformed, expandable fiberglass construction is obtained by the method described hereinabove except that the construction comprises a three-layered member having (a) a core or center layer comprising at least one layer of continuous strand fiberglass mat, the fibers of which are held together by a cured thermosettable binder resin which is insoluble in the polymerizable liquid thermosettable resin mixture, between (b) a first outer layer and a second outer layer, each outer layer comprising at least one layer of chopped strand fiberglass mat, the fibers of which are held together by thermoplastic binder resin which is soluble in the liquid polymerizable thermosettable resin mixture. It is to be understood that when this expandable fiberglass construction is used in the method of the invention, one of the outer layers is contacted with the plastic shell and the other is contacted with the plastic membrane. While it is especially advantageous to use this expandable fiberglass construction as a preform invention, this construction may also be used advantageously as a flat construction to make flat articles by the method of the invention wherein a flat plastic shell and a flat plastic membrane are also used. When used in the process of the invention wherein the initial vacuum on the molding system is reduced prior to hardening, the center continuous strand fiberglass layer selectively expands from a compacted state to its original expanded open network state. The resulting article contains air voids interspersed throughout the center of the cross-section of the fiberglass construction adding thickness to the article without sacrificing strength, stiffness and lightness of weight. Further, the use of this fiberglass construction allows for easy control of the density of the expandable center layer, provides a center layer which is homogenous with the outer layers of the reinforcing laminate materials and, therefore, will not "telegraph" discontinuities, and permits facile adaptability of the fiberglass laminate to any shape and thickness.

In yet another most preferred embodiment a preformed fiberglass construction is prepared as described above for the expandable fiberglass construction except that the core or center layer of continuous strand fiberglass mat contains, in the air voids between the fibers thereof, microspheres made of material such as, for example, glass, phenolic resin or other suitable plastic polymeric material. Although either solid or hollow microspheres may be used in this embodiment, it is especially preferred to use hollow microspheres in order to minimize the weight of the product article. In this embodiment, the continuous strand glass fibers and the microballoons are bonded together by thermoplastic binder resin. This microballoon-filled fiberglass construction is prepared by spreading a synthetic foam of microballoons dispersed in thermoplastic binder resin, for example, polyester base resin which is soluble in the liquid polymerizable thermosettable resin mixture, over the continuous strand fiberglass core and then drying the resulting filled fiberglass core. The outer layers of chopped strand fiberglass mat are then applied to the core. The resulting microsphere-filled fiberglass construction may then be preformed as described hereinabove. Alternatively, this filled fiberglass construction may be prepared at the processing site just prior to use by spreading a syntactic foam of microballoons dispersed in resin mixture over the core and then applying the outer layers. It is to be understood that when this microsphere-filled fiberglass construction is used in the method of the invention, one of the outer layers is contacted with the plastic shell and the other is contacted with the plastic membrane. While it is especially advantageous to use this microsphere-filled fiberglass construction as a preform in the method of the invention, this construction may also be used advantageously as a flat construction to make flat articles by the method of the invention wherein a flat plastic shell and a flat membrane are also used.

The liquid plastic resin mixture which is employed in this invention, preferably, is characterized by the following properties: (1) low viscosity; (2) moisture resistance; and (3) favorable wetting properties. When this resin mixture is a polymerizable liquid thermosettable resin mixture, it is preferably further characterized as having sufficiently high reactivity so as to allow complete polymerization in thin coatings but sufficiently low reactivity so as to prevent an excessively high exotherm which would affect distortion of the thermoplastic shell. Suitable liquid plastic resin mixtures include (a) a polymerizable liquid thermosettable resin mixture selected from the group consisting of polyester/styrene, crosslinking acrylic, epoxy, urethane, phenolic, melamine, silicone resin mixtures, and (b) a thermoplastic resin. It is to be understood that when the resin mixture used in the method of the invention is a polymerizable liquid thermosettable resin mixture, the resin mixture further includes a polymerization catalyst system, the hardening of which constitutes curing of the resin mixture. When the resin mixture is a polyolefin resin mixture such as, for example, molten polypropylene, the hardening thereof constitutes cooling the resin to a temperature below its melting point. Thermoplastic resins such as polypropylene may be conceivable in the method of the invention for making articles to be characterized by lower heat resistance than that obtained with the use of thermosetting resins.

More preferably, the resin mixture employed in the invention is a polymerizable liquid thermosettable resin mixture selected from the group consisting of polyester/styrene and crosslinking acrylic resin mixtures. These more preferred resin mixtures possess the additional desirable property of not undergoing condensation reactions in the course of polymerization. This property permits low molding pressures associated with their use.

Any known polymerizable liquid crosslinking acrylic composition which comprises at least 50% by weight of acrylic monomers is suitable for use in this invention. Suitable monoethylenically unsaturated acrylic monomers include, for example, any known alkyl or aralkyl esters of acrylic or methacrylic acid. Suitable crosslinking polyunsaturated monomers which are copolymerizable with the acrylic monomers useful in this invention include, for example, alkylene diacrylates and dimethacrylates, and alkylene triacrylates and trimethacrylates, and polyvinyl aromatic compounds. Although polymerizable crosslinking acrylic resin mixtures have the advantage of being able to form chemical bonds with a great variety of thermoplastic materials and being able to polymerize the presence of air and having suitably low viscosity, they suffer the disadvantage of being quite costly.

Most preferably, the resin mixture employed in this invention is a polymerizable liquid polyester/styrene resin mixture. As is known in the art, a polyester base resin comprises the product of the reaction of at least one polymerizable ethylenically unsaturated polycarboxylic acid such as, for example, maleic acid or its anhydride, and a polyhydric alcohol such as, for example, propylene glycol and, optionally, one or more saturated polycarboxylic acids such as, for example, phthalic acid or its anhydride. The resulting polyester base resin is then diluted with a liquid polymerizable monomer.

The polymerization of the polymerizable liquid thermosettable resin mixture may be initiated by any of the means known in the art for generating free radicals. The polymerization catalyst system may be a self-curing catalyst/accelerator system comprising as the catalyst, a peroxide such as, for example, benzoyl peroxide or pentanedione peroxide, and as the accelerator, a tertiary amine such as, for example, dimethyl- or diethylyaniline or a polyvalent metal-containing complex or salt such as, for example, cobalt naphthenate. Alternatively, a photosensitive initiator such as, for example, benzoin or a benzoin ether, which reacts under radiant energy applied through the transparent plastic membrane such as, for example, ultra violet or infrared light waves, may be used in combination with a low temperature reactive peroxide such as, for example, peroxidicarbonate.

Fillers, such as, for example, alumina trihydrate, can be used in this invention to increase the resin mixture volume, to reduce the amount of costly resin mixture required, and to impart fire resistance to the resulting article.

A particular advantage of the method of the invention is the modification of the known vacuum bag molding process wherein a performed plastic membrane, or vacuum bag, is used in combination with a preformed plastic shell and a preformed reinforcement layer. When vacuum is applied to the molding system as set forth hereinabove, pressure is applied equally to all surfaces in any plane rather than only predominantly in a vertical direction such that full compression is achieved only on a horizontal surface and lesser compression is achieved on other surfaces, the lesser compression being proportional to the angle of a given other surface from the horizontal surface. This feature allows for a greater degree of uniformity in the resulting article, greater economy in regards to the amount of resin mixture required, elimination of the possibility of poor secondary bonding between layers cured at different times, and minimization of labor cost in that hand-assistance, for example, to evenly distribute resin mixture and to eliminate air voids beneath the surface of the vacuum bag, is eliminated or greatly reduced. Another particular advantage of the method of the invention is that high strength, high stiffness and optional lightness of weight of articles is achieved with the use, in the most preferred embodiments, of fiberglass reinforcement materials wherein the fiberglass is continuous from one surface of the article to the other surface; this advantage is achieved with flat articles or with articles having variable configuration characteristics. This feature (1) allows for more efficient transfer of impact forces from the site of impact on the article to all supporting fibers in the impact area, (2) allows for improved shear stress resistance near the center line of the laminate relative to the shear stress resistance of prior art articles such as, for example, articles having "sandwich constructions", and (3) eliminates delamination problems associated with prior art articles such as, for example, "sandwich constructions". These advantages are especially achieved when the expandable fiberglass and the microsphere-filled fiberglass constructions of the invention are used as the reinforcement material wherein optimal thickness is achieved with relatively low amounts of fiberglass. Addition advantages in the method of the invention are achieved with respect to processing and handling.

Because of the low pressures and temperatures used in the method of the invention, low cost tooling can be made of fiberglass and plastic. Further, because a thermoformed thermoplastic shell having cosmetic surface is used, the necessity of using a polished mold surface as is required in gel-coating molds or compression molds is eliminated. Also, the application of mold release agents to matched die mold parts to allow removal of the product part is unnecessary. Accordingly, the holding fixture used in the method of this invention is made using, as a pattern, one of the thermoformed thermoplastic shells prepared for use in the method of the invention. The thin thermoformed thermoplastic shell is supported, if necessary, and treated with any known mold release agent. Fiberglass mat is then applied to the surface of the mold release agent-treated pattern by spraying or hand lay-up allowing a flange of at least four inches in width. Polyester resin is then applied to the fiberglass mat material and cured to give support to the shell. Initial layers of fiberglass mat and polyester resin must be thin in order to prevent distortion of the pattern. The holding fixture can be increased in thickness by applying successive layers of fiberglass mat and polyester resin until any suitable thickness is achieved. The edges of the holding fixture are then trimmed and the holding fixture is then fitted with a suitable box support, a rubber edge and a vacuum port in the flange.

The following examples are presented to illustrate but a few of the advantages of articles and methods of the invention. Each of the articles in the examples is prepared as a flat fiber reinforced article using, as the thermoplastic shell, a section of 0.040 inch thick flat acrylic sheet. The Frontal, and Reverse, Impact Strength of the articles of the examples is determined by the Falling Dart Impact Test—an SPI Proposed Impact Test Method for Plastic Parts, January, 1965.

EXAMPLE 1

A fiberglass reinforced composite article according to the invention is prepared by applying a section of flat acrylic sheet having a thickness of 0.040 inches to a holding fixture having a flat surface. Then a mixed fiberglass reinforcement material, wherein the fiberglass reinforcement material is made up of a construction comprising a three-layered member having a core comprising three layers of continuous strand fiberglass mat placed between two outer layers, each outer layer comprising two layers of chopped strand fiberglass mat, is applied to the surface of the acrylic sheet. A sufficient amount of polymerizable liquid thermosettable polyester resin is introduced to the fiberglass reinforcement material such that resulting the resin mixture-saturated reinforcement material comprises 42% by weight of glass and the remaining 58% is the resin mixture. A flat plastic membrane is then applied to the surface of the resin mixture containing fiberglass material thereby forming a molding system. The resulting molding system is subjected to an initial vacuum of about 25 inches of mercury until the fiberglass is saturated throughout with resin mixture. Then the vacuum is reduced to about 3 inches of mercury, thereby allowing the core of continuous strand fiberglass layers to expand to the original expanded open network state while the outer-chopped strand fiberglass mat layers remain compacted. The resin mixture is then allowed to completely cure. The resulting article has a thickness of 0.270 inches, a weight of 1.60 lbs/sq. ft., and Frontal and Reverse Impact Strengths of 70 ft.-lbs. and 20 ft.-lbs., respectively.

EXAMPLE 2

Another fiberglass reinforced composite article according to the invention is prepared by applying a section of flat acrylic sheet of 0.040 inches to a holding fixture having a flat surface. Then fiberglass reinforcement material is applied to the surface of the acrylic sheet. This fiberglass reinforcement material comprises a fiberglass construction comprising a three-layered member having a core of two layers of continuous strand fiberglass mat having evenly distributed over the surface thereof a syntactic foam consisting of polymerizable liquid thermosettable polyester resin containing 18 pph microballoons. This core is placed between two outer layers of dry chopped strand fiberglass mat, each outer layer comprising two layers of chopped mat. The amounts of glass and syntactic foam are selected such that the resulting syntactic foam saturated reinforcement material consists of about 25% by weight of glass and about 25% syntactic foam. A flat plastic membrane is then applied to the surface of the syntactic foam saturated reinforcement material thereby forming a molding system. The resulting molding system is subjected to a vacuum of about 25 inches of mercury until the fiberglass is saturated throughout. Then the resin system is allowed to completely cure. The resulting article has a thickness of 0.279 inches, a weight of 1.18 lbs/sq. ft., and Frontal and Reverse Impact Strengths, of 62 ft.-lbs. and 50 ft.-lbs., respectively.

EXAMPLE 3

A laminated fiberglass reinforced article according to the invention is prepared as described in Example 2 except that one of the outer layers of the fiberglass construction comprises a single layer of chopped strand fiberglass mat applied to a surface of the core and a single layer of 24 ounce woven roving applied to the outersurface of the single layer of chopped mat. The fiberglass reinforcement material is applied to the surface of the acrylic sheet such that the outer layer of the fiberglass reinforcement laminate comprising the two layers of chopped mat is contacted with the acrylic sheet. The resulting article has a thickness of 0.374 inches, a weight of 1.25 lbs/sq. ft., and Frontal and Reverse Impact Strengths of about 99 ft.-lbs. and 56 ft.-lbs. respectively.

EXAMPLE 4

A comparative fiberglass reinforced laminate article according to the invention is prepared by applying to a holding fixture having a flat surface a section of flat acrylic sheet having a thickness of 0.040 inches. Then fiberglass reinforcement material consisting of 9 layers of chopped strand fiberglass mat is applied to the surface of the acrylic. Next, a sufficient amount of polymerizable liquid polyester resin mixture is introduced to the reinforcement material such that the combined resin mixture saturated reinforcement material consists of about 50% by weight glass and about b 50% by weight resin mixture. Then a plastic membrane is applied to the surface of the resin mixture saturated reinforcement material to form a molding system. The system is subjected to a vacuum of about 25 inches of mercury and the resin mixture is allowed to cure. The resulting article has a thickness of 0.310 inches, a weight of 2.10 lbs/sq. ft., and Frontal and Reverse Impact Strengths of 90 ft.-lbs. and 45 ft.-lbs., respectively.

What is claimed is:

1. A performed fiberglass construction comprising a three-layered member having (a) a center layer comprising at least one layer of continuous strand fiberglass mat containing lightweight microspheres in the voids between the fibers of said continuous strand fiberglass mat, the microspheres and the fibers being bonded together by thermoplastic binder resin which is soluble in polymerizable liquid thermosettable resin mixture, between (b) a first outer layer and a second outer layer, each outer layer comprising at least one layer of chopped strand fiberglass mat containing thermoplastic binder resin which is soluble in polymerizable liquid thermosettable resin mixture.

2. An expandable fiberglass construction comprising a three-layered member having (a) a center layer comprising at least one layer of continuous strand fiberglass mat containing a cured thermosettable binder resin which is insoluble in polymerizable liquid thermosettable resin mixture, between (b) a first outer layer and a second outer layer, each outer layer comprising at least one layer of chopped strand fiberglass mat containing thermoplastic binder resin which is soluble in polymerizable liquid thermosettable resin mixture.

* * * * *